Figure 1:
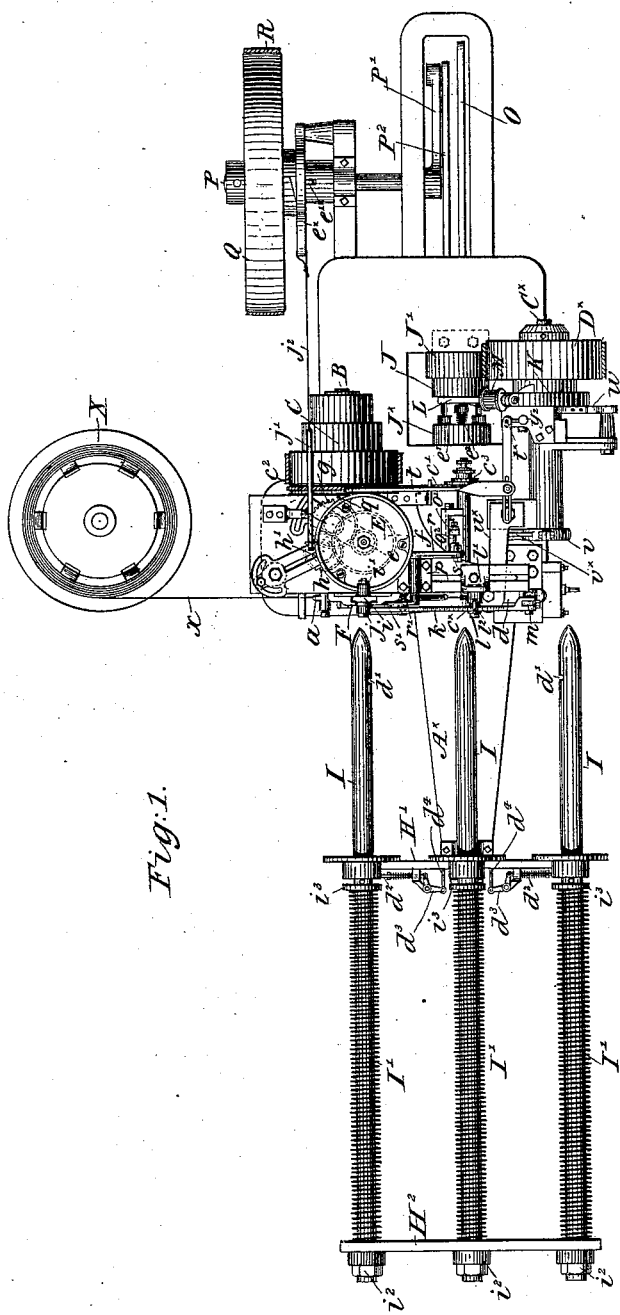

(No Model.) 8 Sheets—Sheet 1.

F. M. JEFFERY.
MACHINE FOR MAKING COIL SPRINGS.

No. 469,943. Patented Mar. 1, 1892.

WITNESSES:
John A. Rennie
Herbert Blossom

INVENTOR:
Frank M. Jeffery
By Henry Connett
Attorney.

(No Model.) 8 Sheets—Sheet 2.

F. M. JEFFERY.
MACHINE FOR MAKING COIL SPRINGS.

No. 469,943. Patented Mar. 1, 1892.

WITNESSES:
John A. Rennie
Herbert Blossom

INVENTOR:
Frank M. Jeffery
By Henry Connett
Attorney.

(No Model.) 8 Sheets—Sheet 3.
F. M. JEFFERY.
MACHINE FOR MAKING COIL SPRINGS.

No. 469,943. Patented Mar. 1, 1892.

WITNESSES:
John A. Rennie
Herbert Blossom

INVENTOR:
Frank M. Jeffery
By Henry Connett
Attorney.

(No Model.) 8 Sheets—Sheet 4.

F. M. JEFFERY.
MACHINE FOR MAKING COIL SPRINGS.

No. 469,943. Patented Mar. 1, 1892.

WITNESSES:
John A. Rennie
Herbert Slofson

INVENTOR:
Frank M. Jeffery
By Henry Connett
Attorney.

(No Model.) 8 Sheets—Sheet 5.
F. M. JEFFERY.
MACHINE FOR MAKING COIL SPRINGS.
No. 469,943. Patented Mar. 1, 1892.
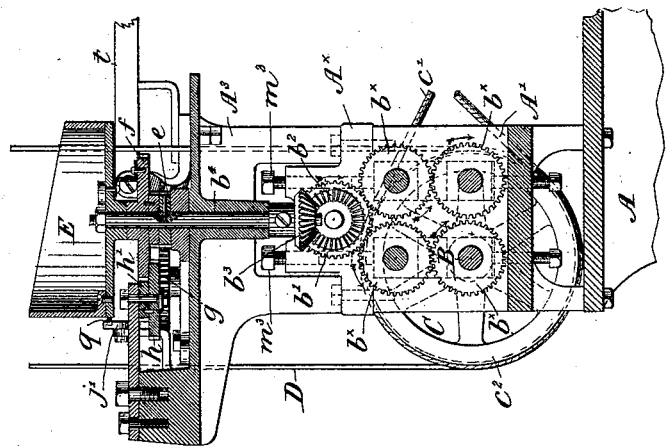
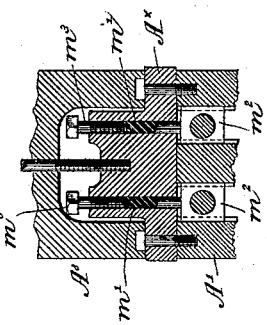
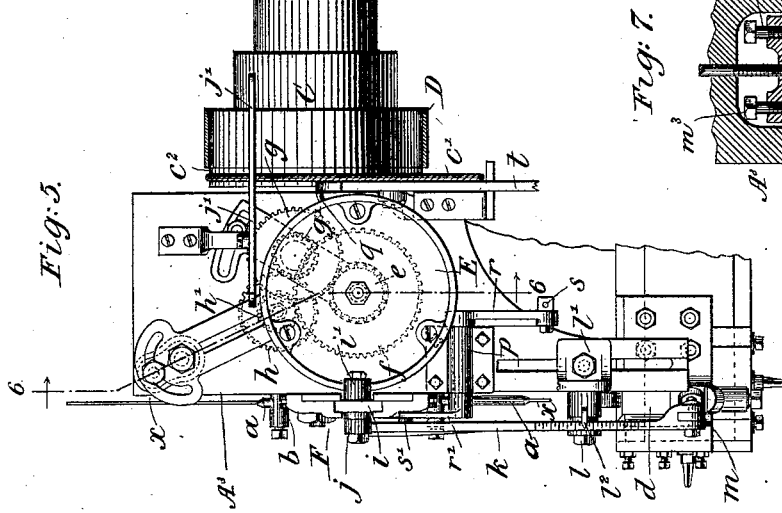
WITNESSES:
John A. Rennie.
Herbert Blossom
INVENTOR:
Frank M. Jeffery
By Henry Connett
Attorney.

(No Model.) 8 Sheets—Sheet 6.
F. M. JEFFERY.
MACHINE FOR MAKING COIL SPRINGS.
No. 469,943. Patented Mar. 1, 1892.
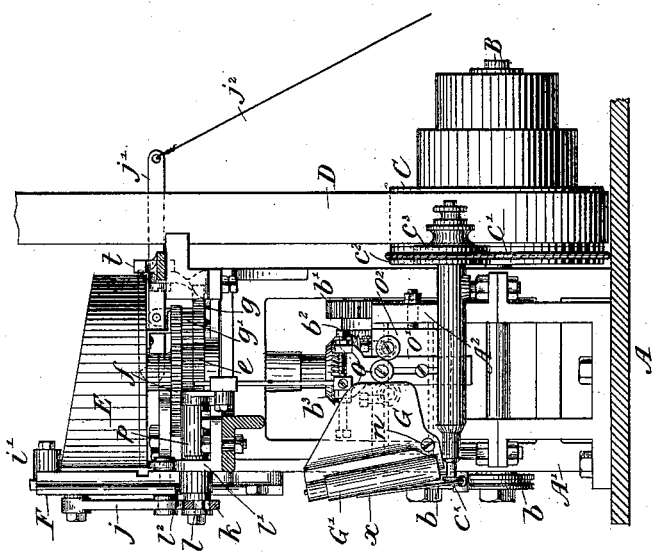
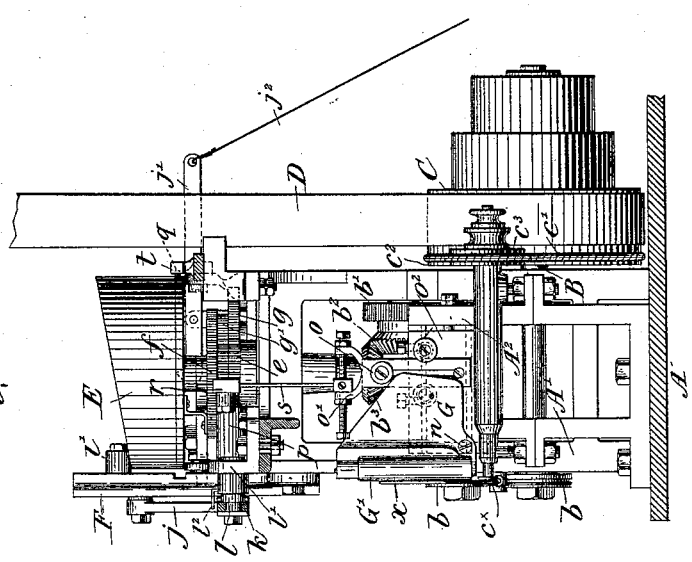
WITNESSES:
INVENTOR:
Frank M. Jeffery
By Henry Connett
Attorney.

(No Model.) 8 Sheets—Sheet 7.
F. M. JEFFERY.
MACHINE FOR MAKING COIL SPRINGS.
No. 469,943. Patented Mar. 1, 1892.
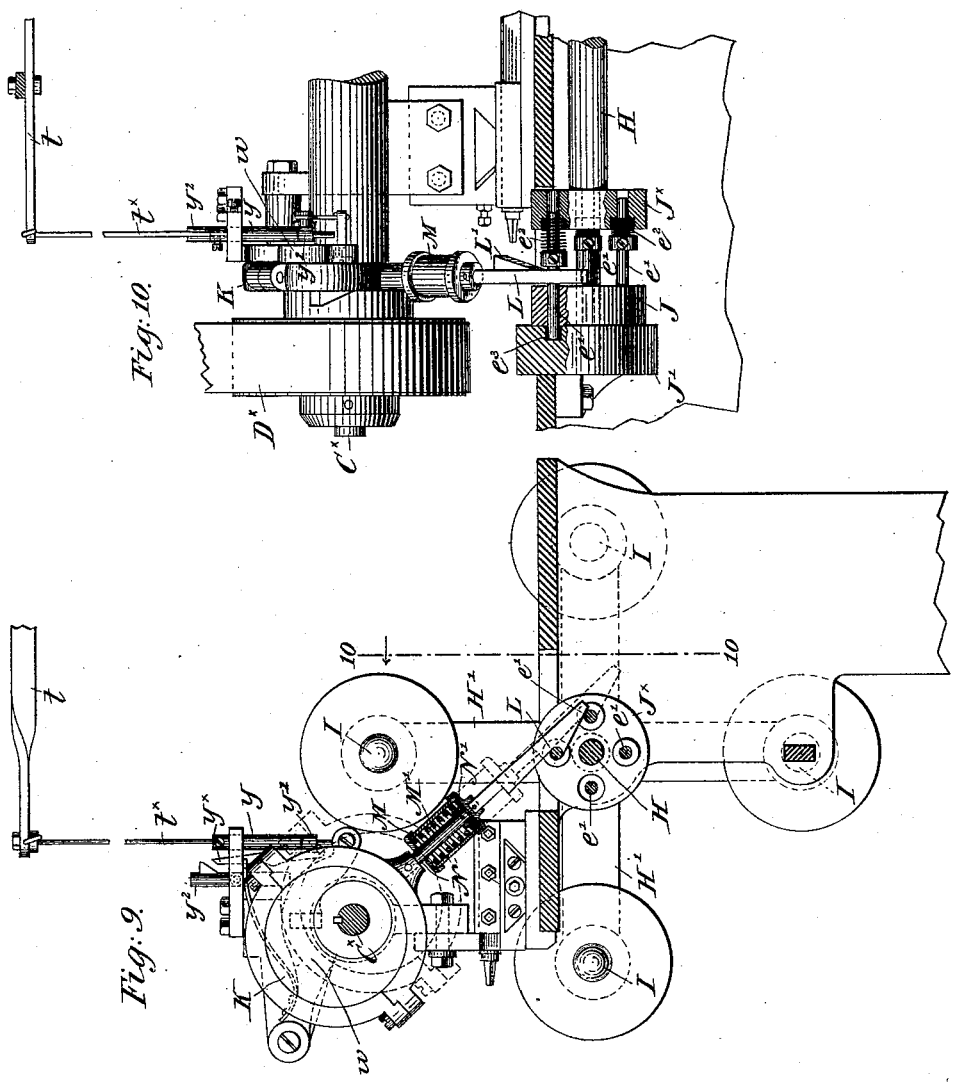
WITNESSES:
John A. Rennie
Herbert Blossom
INVENTOR:
Frank M. Jeffery
By Henry Connett
Attorney.

(No Model.)  8 Sheets—Sheet 8.
F. M. JEFFERY.
MACHINE FOR MAKING COIL SPRINGS.
No. 469,943.  Patented Mar. 1, 1892.
Fig. 11.
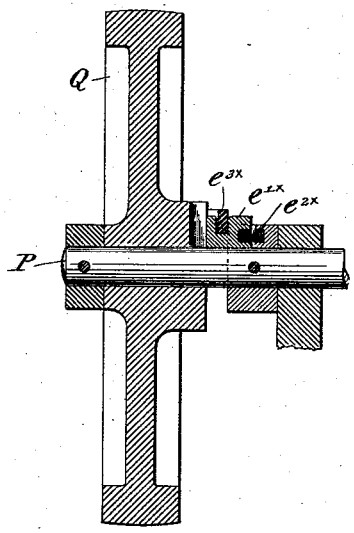
Fig. 11ª.
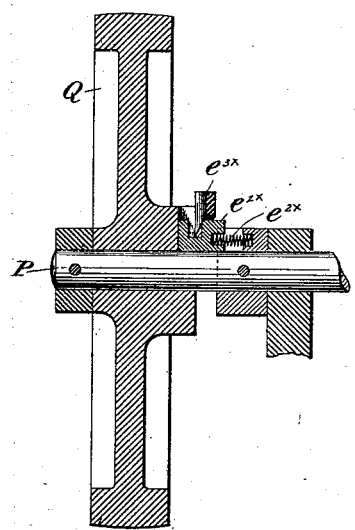
Fig. 12.
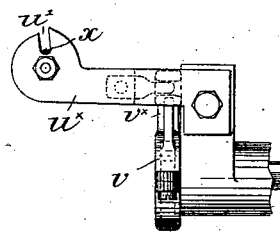
Fig. 12ª.
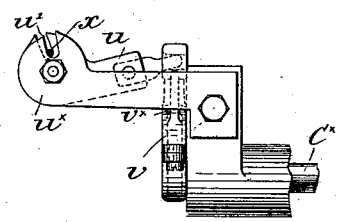
INVENTOR:
Frank M. Jeffery
WITNESSES:
John A. Rennie
Herbert Blossom
By Henry Connett
Attorney.
THE NORRIS PETERS CO., PHOTO-LITHO., WASHINGTON, D. C.

UNITED STATES PATENT OFFICE.

FRANK M. JEFFERY, OF JERSEY CITY, NEW JERSEY.

MACHINE FOR MAKING COIL-SPRINGS.

SPECIFICATION forming part of Letters Patent No. 469,943, dated March 1, 1892.

Application filed June 8, 1891. Serial No. 395,459. (No model.)

*To all whom it may concern:*

Be it known that I, FRANK M. JEFFERY, a citizen of the United States, and a resident of Jersey City, in the county of Hudson and State of New Jersey, have invented certain Improvements in Machines for Making Coil-Springs, of which the following is a specification.

My invention relates to the class of machines for making spiral springs of irregular form from wire, strips of metal, and the like, and the object is to provide an automatic machine capable of being set to produce springs of different sizes and varieties of form and varying in pitch. The machine embodying my invention also cuts off the springs automatically as formed and compresses them.

The machine is capable of producing coil-springs of various forms, notably those having the form of an hour-glass, a spindle, or double cone, &c., the diameter of the spring being varied automatically. The pitch of the spring is also variable automatically, means being provided for winding the end coils or rings of the spring without pitch, so that the planes of the ends of the spring will be at right angles to the spring-axis. The length of the spring may also be varied by varying the speed of the cam which controls the form or diameter.

The invention will be fully described hereinafter, and its novel features carefully defined in the claims.

Figure 2:
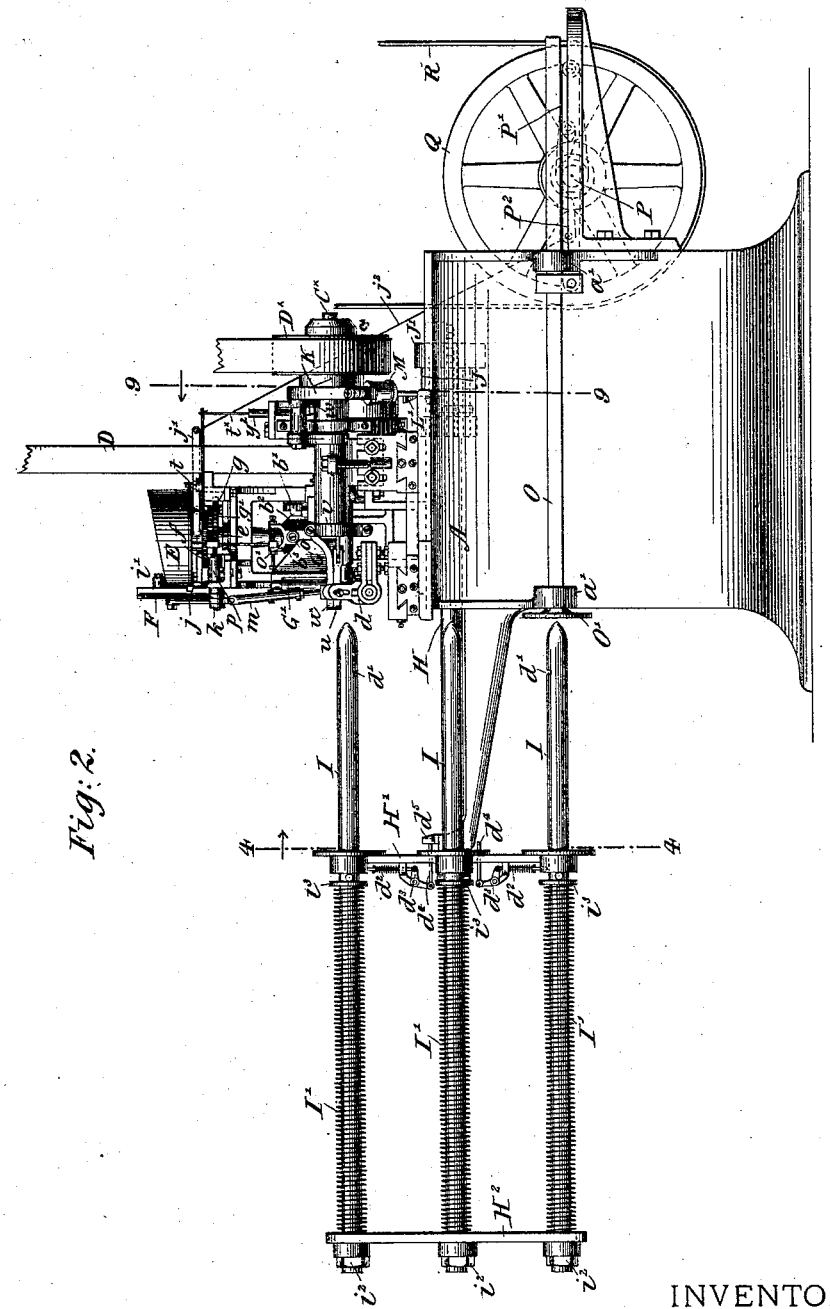
Figure 3:
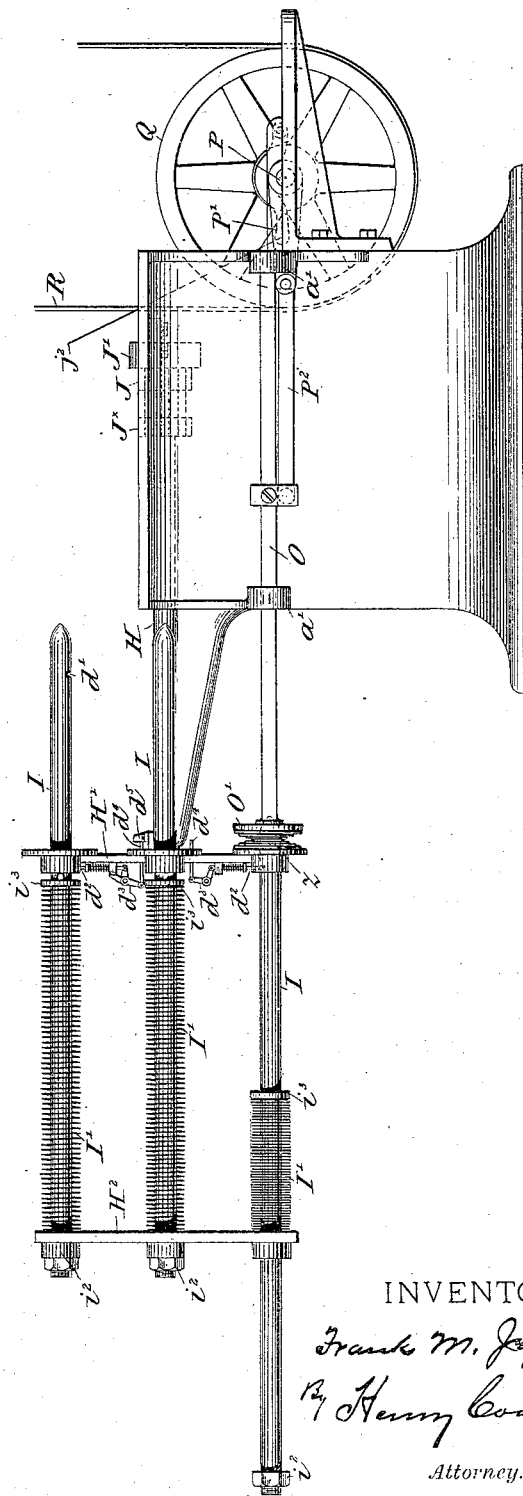
Figure 4:
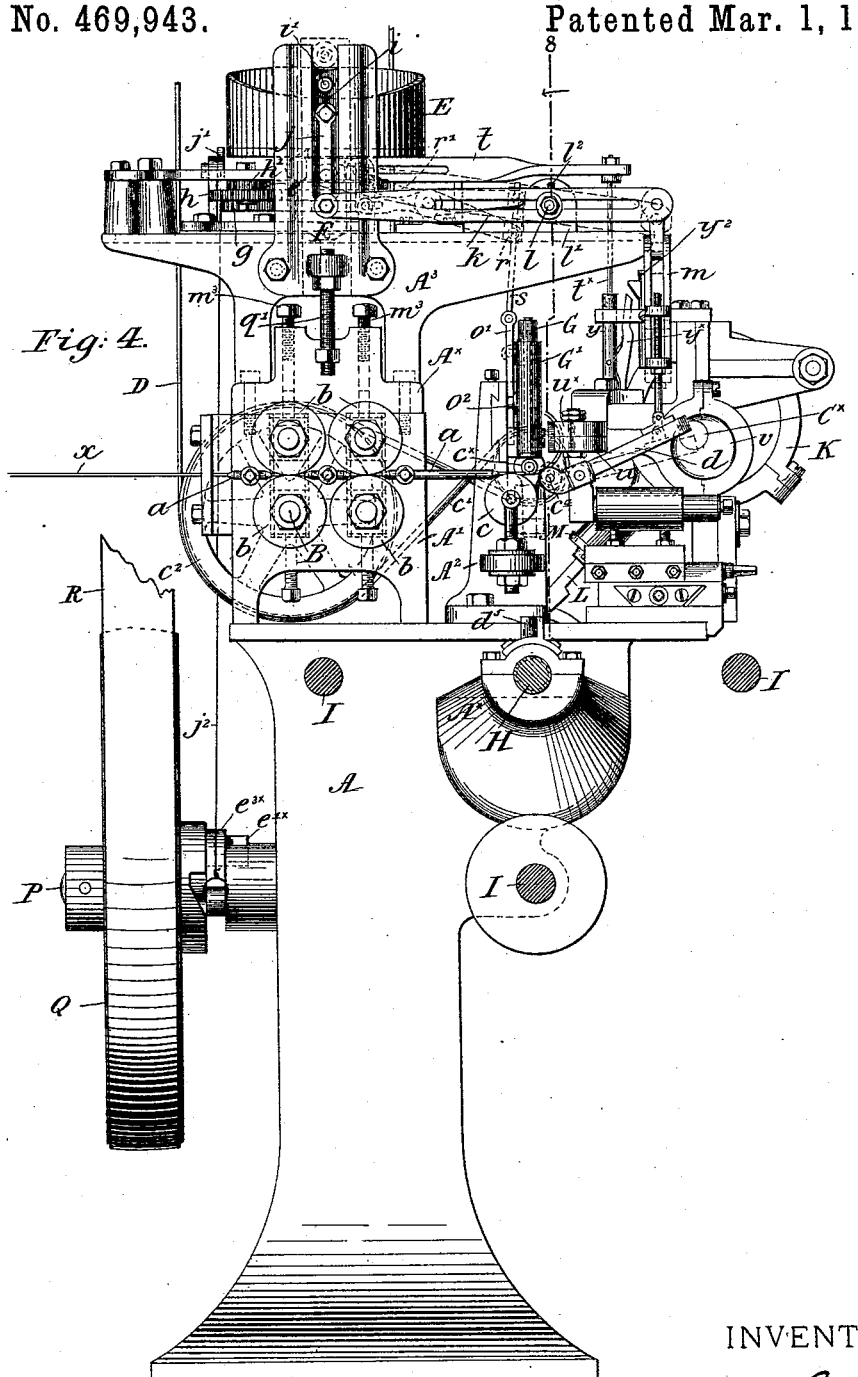

In the accompanying drawings, which serve to illustrate my invention, Figure 1 is a plan of a machine embodying my improvements. Fig. 2 is a side elevation of the same, and Fig. 3 is a side elevation of the lower part only of the machine, as seen in Fig. 2, showing the spring compressing and discharging mechanism in a different position from that seen in Fig. 2. The above are general views on a small scale. Fig. 4 is a sectional elevation of the machine on a scale double that of the general views. This view shows the main portion of the machine in what I will call, for convenience, "front elevation," the position of the plane of the section being indicated by line 4 in Fig. 2. Fig. 5 is a plan view on the same scale as Fig. 4, showing a portion of the mechanism seen in Fig. 1, but on a larger scale; and Fig. 6 is a vertical section in the broken plane indicated by the line 6 6 in Fig. 5. Fig. 7 is a sectional detail view on the same scale as Fig. 4, which will be hereinafter described. Fig. 8 is a sectional elevation in the vertical plane indicated by line 8 8 in Fig. 4, and Fig. $8^a$ is a similar view showing the operative parts in a different position. Fig. 9 is a vertical section on the same scale as Fig. 4, taken in a plane the position of which is indicated by line 9 9 in Fig. 2; and Fig. 10 is a section in the plane indicated by line 10 10 in Fig. 9. Figs. 11 and $11^a$ are sectional views illustrating the clutch mechanism detached. Figs. 12 and $12^a$ are plan views of the wire-cutter detached.

A is the bed-piece of the machine, which may be of any form and material. On this bed-piece are mounted the upper parts of the frame, (designated by the letters $A'$, $A^2$, and $A^3$.)

B is the main shaft of the machine, mounted in bearings in the part $A'$ of the frame. It is driven through the medium of the cone-pulley C and a belt D.

$x$ represents the wire from which the springs are formed. It comes from a reel X (seen in Fig. 1) or from any source. The wire passes through guides $a$ on the frame (see Fig. 4) and is fed forward to the benders by two pairs of feed-wheels $b$. One of these feed-wheels is on the main shaft B and the others on studs in the frame. The manner of driving all the feed-wheels $b$ from the shaft B is clearly shown in Fig. 6. Each wheel is secured to or forms a part of a toothed wheel $b^x$, and these latter are geared together in pairs and the pairs connected by an intermediate gear-wheel $b'$, rotatively mounted on a stud in the frame. The wire when fed forward by the feed-wheels enters the benders or bending mechanism. This latter consists of three grooved wheels, two of which are normally merely rotative, while the third is adapted to be moved toward and from the others for the purpose of varying the diameter of the spring. The larger wheel $c$ is an idler and the small wheel $c^x$ is fixed on a shaft which is driven positively from the main shaft B through the medium of a belt $c'$ and sheaves or pulleys $c^2$ and $c^3$, respectively, on the main shaft B and the shaft of the bending-wheel $c^x$. The third wheel $c^4$ of the bender is mounted in the end of a rocking lever $d$ and is somewhat in the nature of an anti-friction bowl or wheel. As the wire passes between the wheels of the bender it is set to the proper curve, being bent about the revolving wheel $c^x$ by the movable or adjustable wheel $c^4$.

One important feature of my machine consists in the mechanism for automatically adjusting the wheel $c^4$ of the bender to suit the requirements of the spring being made. For example, if the spring to be made is of the "hour-glass" form commonly used in spring-beds, at starting the wheel $c^4$ will be at its maximum distance from the wheel $c^x$, and as the spring is being formed this wheel $c^4$ is caused to move gradually toward the wheel $c^x$, so as to gradually reduce the diameter of the spring until the latter is half-finished, when the said wheel $c^4$ gradually moves back to its first position during the formation of the last half of the spring. This movement of the wheel $c^4$ is effected by means of a properly-shaped cam and intermediate mechanism, which I will now describe with especial reference to Figs. 4, 5, and 6.

The toothed wheel $b'$ (see Fig. 6) is secured to a bevel-wheel $b^2$ and thus rotates the latter. This wheel $b^2$ gears with another bevel-wheel $b^3$, secured on an upright shaft $b^4$, rotatively mounted in the frame. On the upper end of the shaft $b^4$ is loosely or rotatively mounted a cam E, which is driven from said shaft indirectly through the medium of a train of gears, some of which are change-wheels, whereby the speed of the cam relatively to the shaft $b^4$ may be varied. On the shaft $b^4$ is secured a toothed wheel $e$, and to the cam E is secured a toothed wheel $f$. The wheel $e$ drives the wheel $f$ through the medium of a train of change-wheels, (seen in Fig. 5,) and which will be, of course, interchangeable, so that the cam E may be driven at any desired speed relatively to the shaft $b^4$, the speed of the latter being uniform. As represented in Fig. 5, the wheel $e$ gears with a change-wheel $g$, to which is concentrically secured a pinion $g'$, which gears with another change-wheel $h$. Secured concentrically to the change-wheel $h$ is a pinion $h'$, which gears with the wheel $f$, connected to cam E. These change-wheels possess no novelty in themselves and may be mounted in adjustable bearings in the usual way.

The cam E, as here represented, is adapted to produce at each revolution an hour-glass or spindle-shaped spring, as will be described, the length of the spring being dependent on the speed of the cam.

The cam E controls the wheel $c^4$ through the medium of mechanism I will now describe. Mounted in guideways in an upright frame F is a slide $i$, which carries a roller $i'$, that rests on the cam E. As the cam rotates this slide is moved up and down. To the slide $i$ is coupled by a link $j$ a slotted lever $k$, which has an adjustable fulcrum $l$. At its other end the lever $k$ is coupled by an adjustable link $m$ to the end of the rocking lever $d$, bearing the bending-wheel $c^4$. The adjustability of the link $m$ enables the wheel $c^4$ to be set at the proper distance from wheel $c^x$ at starting, and the adjustability of the fulcrum $l$ serves to increase or decrease at will the extent of movement imparted to the wheel $c^4$ by the cam. The fulcrum-stud $l$ is carried by a slide $l'$, mounted in a slot in the frame $A^3$, as seen in Fig. 5, and in order that the fulcrum may be adjusted to a predetermined extent the upper edge of the lever $k$ may have graduation-marks on it and the fulcrum be provided with an index or point $l^2$. It is obvious that means must be provided for producing the pitch of the spiral while the spring is being formed and yet leave the first or end coil of the spring without pitch or with its plane substantially at right angles to the axis of the spring. The mechanism I employ for this purpose will now be explained with especial reference to Figs. 5, 8, and 9.

A rocking frame G is mounted in the frame on a pivot at $n$, and in this frame is mounted an anti-friction roller G', which stands normally, as seen in Fig. 8—that is, at right angles with the axes of the bending-wheels. This roller G' stands just over or above the shaft of the wheel $c^x$, as seen in Fig. 4. The inner edge of the frame G is inclined and angular, and a cam-roller $o$ is adapted by the downward movement of said slide to strike the incline on the frame G and turn the latter about its pivot until it assumes the position seen in Fig. 8$^a$. This inclines the roller G', which in turn bears on the coil of the spring as it issues from the bending-wheels and bends it laterally in such a manner as to impart the pitch or spiral form to the spring. The slide $o'$ is actuated by mechanism I will now describe. Mounted in a bearing $p$ in the frame $A^3$ is a crank-shaft having cranks at its ends turned in opposite directions, whereby they become in substance a rocking lever. One crank $r$ is coupled by a link $s$ to the slide $o'$, and the other crank $r'$ has a stud $s'$, which engages a slot in the lever $k$. At starting and when the lowest part of the cam E is under the cam-roller $i'$ the cam-roller $o$ is at the highest point of its travel and is then a little above the inclined cam-surface on the frame G, as seen in Fig. 8. The roller G' is then in an upright or vertical position. The cam E starts to rotating; but it moves so slowly, relatively, that one coil or ring of the spring will have been formed by the bending-wheels before the cam has an opportunity to act through the levers $k$ and $d$ on the bending-wheels to an extent sufficient to very materially diminish the diameter of the spring. In the meantime the cam-roller $o$ will have descended to the inclined cam-surface on frame G, and after one coil or ring of the spring shall have been formed the roller $o$ will act to press upon said cam-surface in such a manner as to force the frame G and roller G' out to the position seen in Fig. 8$^a$, as before stated. The further downward travel of the roller $o$ will not, or need not, incline the roller G' to any greater extent; but said roller $o$ will still bear on the back or inner edge of the frame G and hold it inclined against the tendency of the spring-wire to force it into an upright position. After the highest part of the cam E shall have passed the cam-roller $i'$ and the spring again begins to increase in diameter the roller $o$ will move upward, and when it rises above the upper angle on the frame G the wire will force the said frame into an upright position again and the terminal coil of the spring will be made like the first—that is, without pitch. The slide $i$ may be drawn down by a spring or be caused to descend by the weight of the parts. The slide $o'$ and frame G are mounted in a keeper-block $o^2$, which is adjustable laterally in the frame $A^2$, whereby these parts may be so adjusted with reference to the bending-wheels as to give to the spring more or less pitch within limits. When the cam E shall have completed one rotation and the spring being made shall have been completed, the latter is cut off by severing the wire.

The means I employ for automatically severing the wire will now be described with especial reference to Figs. 4, 12, and $12^a$.

I will say, primarily, that the mechanism for cutting off the wire is not driven from the main shaft B, but from another shaft $C^\times$, through the medium of a pulley $D^\times$, which turns loosely on said shaft and is made to drive the shaft through the medium of a clutch controlled by the cam E. This clutch I do not claim.

The mechanism of the cutter is illustrated detached in Figs. 12 and $12^a$, the former being a plan view showing the jaws open and the latter a similar view showing the movable jaw closing on the wire. The cutter comprises a lower movable jaw $u$ and an upper stationary jaw $u^\times$. These jaws are substantially alike in form, and when at rest, as in Fig. 12, the cutting-notches $u'$ therein coincide and stand with respect to the bending-wheels in position for the wire of the spring to pass in an upward direction through the coincident notches $u'$. On the shaft $C^\times$ is an eccentric $v$, the strap of which is coupled by a rod $v^\times$ with the shank of the movable jaw $u$, as clearly shown in Fig. $12^a$. Normally the jaws of the cutter stand open, as in Fig. 12, and when the rapidly-rotating pulley $D^\times$ is momentarily connected with its shaft $C^\times$ by the clutch the shaft makes a single rotation and the cutter operates to sever the wire, thus separating the coiled spring therefrom.

The clutch is a well-known device for causing a constantly-rotating pulley to turn its shaft once around and then automatically release it. It comprises a spring-dog held out of engagement with the pulley by a cam-lever, which when raised allows the dog to engage. The lever is instantly lowered, and when the shaft shall have made one complete rotation the said lever acts to retract the dog again and thus disengage the pulley from the shaft.

I will now describe the means whereby the cam E controls the operation of the clutch. In the cam E is a projecting stud or pin $q$, which at the proper time wipes over a beveled or rounded toe on a lever $t$, thus depressing that end of said lever and elevating the opposite end, which is or may be connected by a rod, wire, or cord $t^\times$ to the cam-lever $w$ of the clutch, thus freeing the clutch-dog and coupling together the pulley $D^\times$ and shaft $C^\times$. As soon as the stud $q$ passes the toe on the lever $t$, the latter allows the cam-lever $w$ to fall, and when the shaft $C^\times$ shall have made one turn the lever will withdraw the clutch-dog and set the pulley $D^\times$ free. I find, however, that, owing to the relatively slow movement of the cam E and the relatively rapid movement of the pulley $D^\times$, it is desirable to provide means for allowing the cam-lever $w$ to fall before stud $q$ frees the lever, and this device I will now describe. The wire $t^\times$ is not connected directly to the lever $w$, but to a bar $y$, which carries a spring-latch $y^\times$, and this latch takes under a sleeve $y'$ (see Fig. 9) on the bar $y$. This sleeve is connected to the cam-lever $w$. When the bar $y$ is lifted by the movement of the lever $t$, the tail of the latch $y^\times$ strikes a cam $y^2$, and the latch is thus caused to release the sleeve $y'$ and permit the lever $w$ to fall. When the bar $y$ again descends, the sleeve $y'$ is pushed up again into engagement with the latch.

When the spring that is being made shall have been severed by the wire-cutter, it will be found on one of the rods of a four-armed receiver and carrier, on which it remains until it has been compressed, after which it will be discharged. This receiving, compressing, and discharging mechanism I will now describe with especial reference to Figs. 1, 3, 4, 9, and 10.

H is a shaft mounted in the main frame and provided with two four-armed frames H' $H^2$, which form sliding bearings for four spring-receiving rods I. Each of these rods has on its rear end a head or stop-nut $i^2$ and just inside of the frame H' a stop-collar $i^3$, and on each rod is a coil-spring I', arranged between said stop-collar and the frame $H^2$. The frame H' is situated at some distance from the front of the machine, where the spring-forming appliances are placed, and the rods I project from said frame nearly to the bending-wheels, their tips being pointed or conical. When this receiving device is at rest, the upper one of the four rods I will be presented to the center of the lesser bending-wheel $c^\times$, being aligned with the shaft of said wheel. In Fig. 4, where the shaft H and rods I are represented in transverse section, I have omitted the section of this upper rod in order to avoid obscuring the other mechanism. As the spring is being formed it moves out on the upper rod I, and a moment after the wire is cut the shaft H makes a quarter-turn, thus presenting another rod I at the receiving-point. This intermittent movement of the shaft H is effected by mechanism, I will now describe with especial reference to Figs. 9 and 10. On the shaft H are two collars or disks J and $J^\times$, in which are mounted in sliding bearings four rods $e'$, which correspond, respectively, to the rods I, as seen in Fig. 9. Each rod $e'$ is provided with a collar and a spring $e^2$, which tends to drive it through the collar J and against a fixed bearing-block $J'$, adjacent to any facing and collar. In this block $J'$ is a socket $e^3$, (seen in Fig. 10,) into which one of the rods $e'$ is projected in the manner of a bolt, so as to lock the shaft H against rotation after each quarter-turn thereof. The shaft H is rotated intermittently a quarter-turn at each rotation of the shaft $C^\times$ by means of an eccentric K on the said shaft $C^\times$, the strap of said eccentric being coupled to a hook L, adapted to engage one of the rods $e'$, as will be explained. The parts are represented in their normal position in full lines in Fig. 9. When the eccentric K makes one rotation the hook is first advanced to the position seen in dotted lines in Fig. 9 and then drawn back again to the normal position, (seen in full lines in said figure,) thus turning shaft H a quarter-way round as the hook engages the next rod $e'$ in its advanced position; but before the shaft H can be turned it is necessary to withdraw the uppermost one of the rods $e'$ from the socket $e^3$, and this is effected by a cam $L'$ (seen in Fig. 10) on the side of hook L, which acts on the collar on the rod $e'$ to drive the latter back and compress its spring $e^2$. As the action of hook L is very quick or sudden, I find that it is advisable to introduce a spring-cushion between the hook L and eccentric K. This cushion is shown in section in Fig. 9. To the shank of the hook is secured a cylinder M, and the strap-rod N enters this cylinder. On the end of the rod N, within the cylinder, is a piston or head $N'$, and between this head and the rear end of the cylinder is arranged a cushion-spring $M'$. This device cushions the strains when the hook is imparting rotation to the shaft H.

I will now describe the spring-compressing device. (Best illustrated in Figs. 2 and 3.) The spring is received on the uppermost one of the rods I, and when this rod, carrying the spring, is brought to the lowest point it will be aligned with a compressing-slide O, mounted in sliding bearings $a'$ on the base A. On the end of the slide O and normally adjacent to the tip of the lower rod I is a compressing-disk $O'$, whereby when said rod is protruded or advanced, as seen in Fig. 3, the spring-bearing rod I is forced back and the spring ($z$ in Fig. 3) compressed against the face of the frame $H'$. Each of the rods I has in it a notch or recess $d'$, and when the rod is forced back, as described, this recess is engaged by a spring-detent $d^2$ on the frame $H'$, which detent holds the rod for the time against being returned to its first position by the spring. The slide O is instantly returned to its first position and the compressed spring $z$ falls from the rod I, being thrown off by its own elasticity. The mechanism for actuating the compressing-slide O is controlled by the cam E. On a transversely-arranged shaft P is loosely mounted a pulley Q, driven rapidly by a belt R. This pulley is adapted to be momentarily coupled to the shaft P by a clutch such as that described with reference to the pulley $D^\times$ and shaft $C^\times$. The clutch is illustrated in the detached sectional views, Figs. 11 and $11^a$, the former showing the clutch-dog disengaged and the latter showing it engaged. In these views $e'^\times$ represents the dog, and $e^{2\times}$ its spring. $e^{3\times}$ is the cam-lever for causing the clutch-dog to engage and disengage. This lever is controlled by the cam E through the medium of a lever $j'$, mounted on the frame and connected by a wire or cord $j^2$ with the cam-lever $e^{3\times}$ of the clutch. The lever $j'$, as here shown, stands at right angles to the lever $t$, and on its free end, which is adjacent to the cam E, it has a raised toe similar to that on lever $t$. The stud $q$ on the cam E impinges on this toe and thus actuates the lever $j'$ and through it the cam-lever of the clutch, whereby the clutch is made to momentarily connect the rotating pulley Q with its shaft P. The shaft P has a crank $P'$, which is coupled by a connecting rod or link $P^2$ with the slide O, whereby at each rotation of shaft P a reciprocating movement is imparted to said slide O.

I have stated that a spring-detent $d^2$ on the four-armed frame $H'$ engages the notch $d'$ in the slide-bar I when the latter is forced back, as seen in Fig. 3; but when the shaft H makes its next quarter-rotation the detent $d^2$ is withdrawn and the rod freed by means of a device, (seen in Figs. 1, 2, and 3,) which consists of a bell-crank $d^3$ on frame $H'$, having one of its arms coupled to said detent and its other arm coupled to an operating-slide $d^4$, mounted in the frame $H'$ and having its free end so situated that when the shaft H rotates said end of the slide impinges on the cam-like face of a stationary lug $d^5$, mounted on a bearing-piece $A^\times$, which supports the said shaft H. The crank $d^3$ is thus rocked and the detent withdrawn.

I employ wheels in the bending mechanism merely to avoid friction, as the wire will usually be fed forward very rapidly and the parts are apt to be unduly heated if the wire rubs over a non-rolling surface. However, by working the machine more slowly these wheels may be dispensed with and non-rolling bending-surfaces be used instead.

The effect of the cam E on the lever $k$ may be modified so that the spring produced will be a modification of the hour-glass form—that is, it will have a cylindrical middle portion and conical extremities. This is effected by providing an adjustable stop, which prevents the cam-roller $i'$ from descending into the hollow at the lower part of the cam E. This device in the present machine consists of a screw $q'$, (seen in Fig. 4,) made to screw up and down through a lug on the frame F, its upper end taking under the end of the lever $k$ at the point where the latter is coupled to the link $j$.

The upper feed rollers or wheels $b$ for the wire (see Fig. 4) are held down by elastic pressure, and the means I prefer to supply for affording a regulated pressure is illustrated in Figs. 4 and 7, the latter being a detached sectional view of this device. The frame $A^3$ is mounted on the frame $A'$, and clamped between them is a block $A^\times$, in which are arranged rubber springs $m'$, which rest on guide-pins in the sliding bearing-blocks $m^2$ of the feed-wheels $b$, the journals of which are seen in Fig. 7. Over the rubber springs $m'$ are arranged screws $m^3$, which serve to regulate the pressure.

Having thus described my invention, I claim—

1. In a machine for making spiral springs, the combination, with means for feeding the wire to the bending mechanism and the said mechanism having a movable wheel $c^4$ carried by a lever $d$, of a rotating cam E, the cam-roller $i'$, its carrying-slide, and the lever $k$, coupled at one end to said slide and at its other end to the lever $d$, said lever $k$ having a movable fulcrum, substantially as and for the purposes set forth.

2. In a machine for making spiral springs, the combination, with positively-driven feed-wheels for feeding the wire to the bending mechanism, the said bending mechanism having a movable wheel $c^4$ carried by a lever $d$, and a rotating cam E, driven positively from the feed-wheels, whereby said cam is driven at a speed having a known relation to that of the feed, of the cam-roller $i'$ and its carrying-slide and the lever $k$, coupled at one end to said slide and coupled adjustably to the lever $d$ at its opposite end, said lever $k$ having an adjustable fulcrum, substantially as set forth.

3. In a machine for making spiral springs, the combination, with means for feeding the wire to the bending mechanism and the said mechanism, of mechanism for regulating the pitch of the spiral of the spring, said pitch-regulating mechanism comprising a rocking frame G, furnished with an anti-friction roller G' and arranged over the bending mechanism, as described, and a reciprocating cam-roller $o$, arranged back of the frame G and adapted to roll over a cam-surface on said frame, substantially as set forth.

4. In a machine for making coil-springs which vary in diameter and form, the combination, with means for feeding the wire to the bending mechanism and the said bending mechanism having a movable wheel $c^4$ carried by a lever $d$, of the shaft $b^4$, driven from the feed-wheels, the cam E, loosely mounted on said shaft, the gear-wheel $e$, fixed on said shaft, the gear-wheel $f$, fixed to said cam, intermediate change-wheels between and connecting said wheels $e$ and $f$, the cam-roller $i'$ and its carrying-slide, and the lever $k$, coupled at one end to said slide and at the other end to the lever $d$, substantially as set forth.

5. In a machine for making spiral springs, the combination, with means for feeding the wire to the bending mechanism, the said bending mechanism, the controlling-cam, its roller and carrying-slide, and the lever $k$, coupled at one end to said slide and at the other end to the lever of the movable bending-wheel, of the device for controlling the pitch of the spring being made, said device consisting of the rocking frame G, arranged over the bending mechanism and having a cam-surface at its rear edge and an anti-friction roller G', the slide $o'$, actuated by the lever $k$, the mechanism intermediate between said slide and lever, and the roller $o$, carried by said slide and adapted to play over the cam-surface on the frame G, substantially as set forth.

6. In a machine for making spiral springs, the combination, with the wire-cutter comprising the jaws $u$ and $u^\times$, arranged adjacent to the bending mechanism, the said bending mechanism, and the wire-feeding mechanism, of the shaft $C^\times$ of the cutter, the cam $v$ thereon, its yoke coupled to the moving jaw of the cutter, the pulley $D^\times$, mounted loosely on the shaft $C^\times$, the clutch for connecting said pulley with said shaft, the cam E, and means, substantially as described, whereby said cam controls said clutch, as set forth.

7. In a machine for making coil-springs, the combination, with a spring-forming mechanism substantially as described and mechanism, substantially as described, for automatically severing the wire when the spring has been formed, of means for receiving and compressing said spring, said means comprising an intermittently-rotating frame having parallel equally-spaced sliding rods I backed by springs, said rods being presented in succession first to the bending mechanism and then to the compressor, and a reciprocating compressor aligned with one of the said rods, whereby the rod is driven back and the spring thereon compressed simultaneously, as set forth.

8. In a machine for making spiral springs, the combination, with wire feeding and bending mechanism, the latter having a wheel $c^\times$, and a rotating cam E, driven from the main shaft which drives the feed-wheels, of the shaft $C^\times$, the independently-driven pulley $D^\times$, loose on said shaft, a clutch to connect said shaft and pulley, means, substantially as described, whereby the cam E controls said clutch, the shaft H, means, substantially as described, whereby rotary motion of the shaft $C^\times$ imparts intermittent rotary motion to the shaft H, the sliding rods I, mounted in said frames, their springs I', means for locking said rods when forced back by the spring-compressing mechanism, means for unlocking the rod after it has passed the compressing-point, the compressing mechanism comprising the shaft P, the rotating pulley Q, loosely mounted on said shaft, the clutch connecting said shaft and pulley, said clutch being controlled by the cam E, the crank on shaft P, the rod connecting said crank with the slide O, and the said slide provided with a head $O^\times$, the respective parts being so arranged that when at rest one of the rods I is aligned with the shaft of wheel $c^\times$ and another is aligned with the slide O, substantially as set forth.

In witness whereof I have hereunto signed my name in the presence of two subscribing witnesses.

FRANK M. JEFFERY.

Witnesses:
HENRY CONNETT,
CHAS. A. WALSH.